Feb. 26, 1957 F. J. EDWORTHY 2,782,546
LANDING NET
Filed Jan. 26, 1955
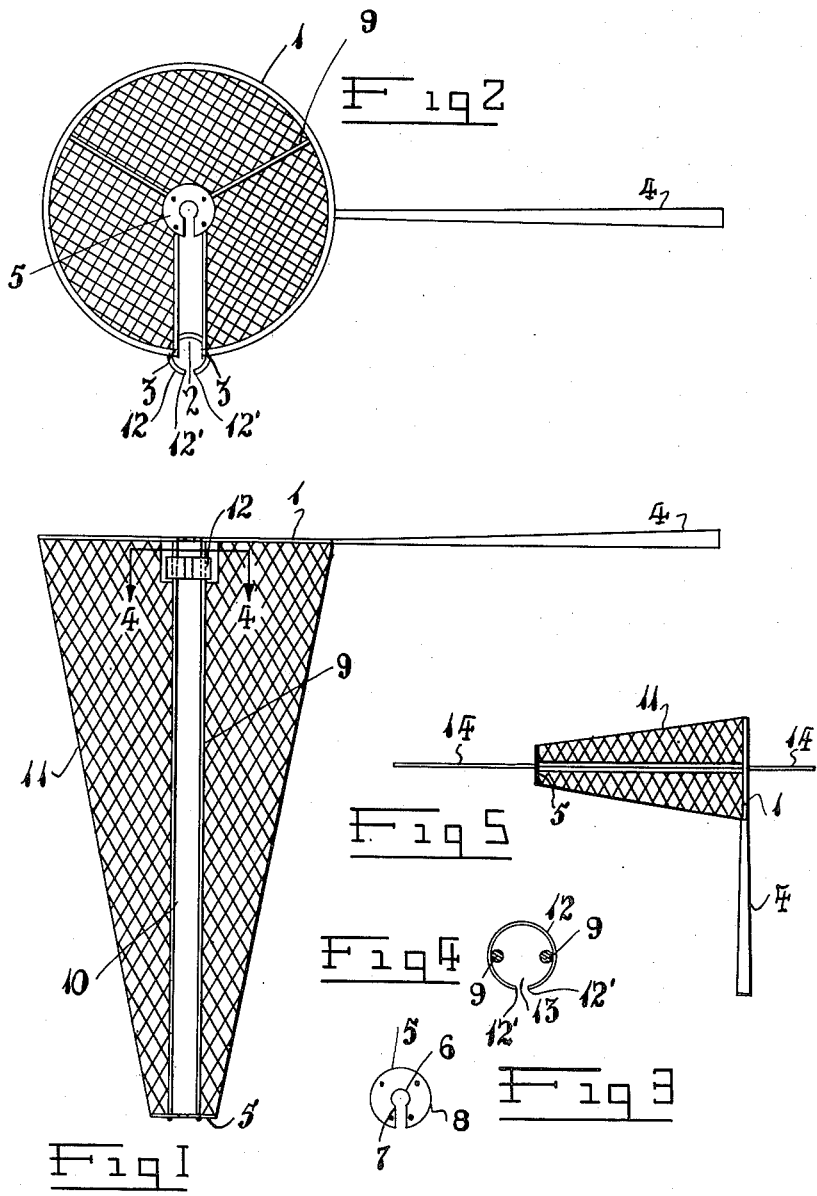
INVENTOR
F. James Edworthy

United States Patent Office 2,782,546
Patented Feb. 26, 1957

2,782,546

LANDING NET

Frederick James Edworthy, Millwater, Manitoba, Canada

Application January 26, 1955, Serial No. 484,093

2 Claims. (Cl. 43—11)

My invention relates to new and useful improvements in landing nets for anglers, the principal object and essence of my invention being to provide a device of the character herewithin described wherein the net can be placed over the line as the fish is being landed, so that the fish is guided into the open end of the net, thus eliminating the normal scooping action associated with landing nets, which is sometimes extremely difficult, particularly when a relatively large fish is encountered.

A further object of my invention is to provide a device of the character herewithin described which includes means whereby the net can be placed over the line, yet retain the open upper end of the net around the line so that it cannot become straight until desired.

A still further object of my invention is to provide a device of the character herewithin described which is extremely simple in construction, economical in manufacture and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a side elevation of my device.

Figure 2 is a top plan view thereof.

Figure 3 is a plan view of the base plate per se.

Figure 4 is an enlarged sectional view of one side of the landing net substantially along the lines 4—4 of Figure 1.

Figure 5 is a reduced side elevation showing my device in use.

In the drawings like characters of reference indicate corresponding parts in the different figures.

The conventional way of landing a fish from a line is to use a scoop-like landing net which is intended to be placed under the fish as it is drawn alongside of the boat or dock so that the fish can be lifted out of the water.

However, it is well known that when relatively large fish are encountered, it is extremely difficult sometimes to manipulate the net under the fish and even when this is successful, the length of the fish usually results in part of the fish overlapping the net, so that an active fish can readily disengage itself from the net.

The present device overcomes these disadvantages inasmuch as it is placed over the line with the open end towards the fish being pulled in, under which circumstances, of course, the fish is drawn right into the net so that it can be lifted into the boat or onto the dock without any difficulty.

Proceeding now to describe my invention in detail, it will be seen upon reference to the drawings that I have provided a circular upper hoop 1 being split as at 2 to provide ends 3 spaced apart at one point on the perimeter thereof. A handle 4 extends radially from the side of the hoop in order that the device may be manipulated.

A circular base plate 5 of smaller diameter than the hoop 1 is centrally drilled as at 6 and provided with a radial slot 7 extending from the drilling 6 to the perimeter 8 of the base plate. This base plate is maintained in spaced apart relationship from the upper hoop 1 by means of a plurality of brace rods 9 secured by their upper ends thereof to the upper hoop 1 and by the lower ends thereof to the base plate 5.

In the accompanying drawings I have provided four of these brace rods, two of which are situated approximately one hundred and twenty degrees apart, and the other two extending from the ends 3 of the hoop downwardly to the base plate and parallel with one another to provide a longitudinal slot 10 in the resulting net. Enclosing material taking the form of open mesh netting 11 is secured around the perimeter of the upper hoop 1 with the exception of the split 2 and also around the base plate 5, with the exception of the slot 7, the edges of the netting being secured to the two bracing rods extending between the ends 3 of the hoop and the base plate. This leaves the aforementioned slot 10 between these two bracing rods.

Means are provided adjacent the split 2 in the upper hoop surrounding the upper ends of the adjacent bracing rods 9, adapted to permit a line to be passed through the slot 10, yet which at the same time, maintains the upper ends of the bracing rods in parallel spaced relationship. This takes the form of a ferrule 12 which is provided with a slit 13 in the sides thereof, said ferrule surrounding the upper ends of the two bracing rods, but being capable of rotating thereon. By this means, when the slit 13 in the ferrule is turned so that it faces outwardly, the associated fishing line 14 may be passed through the slit in the ferrule, whereupon the ferrule may be rotated so that the slit 13 is inwardly, so that the line can then be passed once again through a slit and into the centre of the upper hoop 1.

In operation, and when a fish is hooked, the line 14 is passed through the ferrule, as hereinbefore described, so that the upper hoop 1 is passed over the line which may then be threaded through the slot 10 between the two bracing rods and through the slot 7 in the bottom plate, so that it enters the aperture 6 in the centre of the bottom plate. It is, of course, realized that in this position, the upper or open end of the truncated cone formed by the netting 11 is facing the head of the fish, which is being drawn in by the fisherman, so that when the fish approaches the net, the net may be centred on the line manually so that the fish is drawn right into the net without any scooping action having to occur.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A landing net for anglers comprising in combination an upper hoop provided with a split, a base plate having a radial slot, the slot in said base plate being in alignment with the split in said hoop, a pair of parallel brace rods extending between said hoop and said base plate, one each adjacent each side of said split and said slot, adapted to maintain said hoop and said base plate in spaced relationship, enclosing material secured to said upper hoop around the perimeter thereof, to said base plate around the perimeter thereof, and to said brace rods along the length thereof, a handle extending from said upper hoop, and means adjacent said split adapted to hold said brace rods in spaced and parallel relationship and adapted to pass a line through said split.

2. The device according to claim 1 in which said means includes a split ferrule provided with a split surrounding the upper ends of said brace rods, said ferrule being rotatable around said rods.

References Cited in the file of this patent
UNITED STATES PATENTS

| | | |
|---|---|---|
| 1,797,251 | Tyrrell | Mar. 24, 1931 |
| 2,626,477 | Richardson | Jan. 27, 1953 |
| 2,641,078 | Gearien | June 9, 1953 |

FOREIGN PATENTS

| | | |
|---|---|---|
| 60,401 | Norway | Jan. 30, 1939 |